United States Patent [19]

Takagi et al.

[11] Patent Number: 4,858,218
[45] Date of Patent: Aug. 15, 1989

[54] OPTICAL RECORDING MEDIUM AND REPRODUCING APPARATUS

[75] Inventors: Akihiro Takagi, Kawasaki; Kiyoshi Kimoto, Tokyo, both of Japan

[73] Assignee: Nikon Corporation, Tokyo, Japan

[21] Appl. No.: 145,704

[22] Filed: Jan. 15, 1988

Related U.S. Application Data

[63] Continuation of Ser. No. 772,473, Sep. 4, 1985, abandoned.

[30] Foreign Application Priority Data

Sep. 12, 1984 [JP] Japan .................................. 59-191310
Dec. 24, 1984 [JP] Japan .................................. 59-272664

[51] Int. Cl.⁴ .......................... G11B 11/10; G11B 7/00
[52] U.S. Cl. ........................................ 369/109; 369/15; 369/44; 369/275
[58] Field of Search ................ 369/109, 110, 111, 283, 369/284, 286, 277, 275, 15, 44, 14, 93

[56] References Cited

U.S. PATENT DOCUMENTS

| | | | |
|---|---|---|---|
| 2,628,288 | 2/1953 | Blaney | 369/14 |
| 3,161,752 | 7/1979 | Basilica | 369/275 |
| 4,310,916 | 1/1982 | Dil | 369/109 |
| 4,325,135 | 4/1982 | Dil | 369/109 |
| 4,467,383 | 8/1984 | Ohta et al. | 360/131 |
| 4,472,748 | 9/1984 | Kato | 369/111 |
| 4,558,440 | 12/1985 | Tomita | 369/110 |
| 4,561,032 | 12/1985 | Matsumoto | 369/110 |
| 4,599,714 | 7/1986 | Endo | 369/110 |

FOREIGN PATENT DOCUMENTS

169947 10/1982 Japan .................................. 369/110

Primary Examiner—Steven L. Stephan
Attorney, Agent, or Firm—Shapiro and Shapiro

[57] ABSTRACT

Apparatus for reproducing recorded information applies a linearly polarized light beam to a recording medium having first and second recorded information tracks. The recording medium is formed so that the intensity of reflected light relative to the incident light varies in accordance with the information recorded in one of the tracks, and the plane of polarization of the reflected light relative to the linearly polarized incident light varies in accordance with the information recorded in the other track. The reflected light is divided into two components having different planes of polarization. A recorded magnetooptic signal is reproduced from the difference in intensity between the two components, and a recorded light intensity signal is reproduced from at least one of the two components.

10 Claims, 7 Drawing Sheets

FIG. 5(a) OUTPUT 20

FIG. 5(b) OUTPUT 21

FIG. 5(c) OUTPUT OF AMPLIFIER 23

FIG. 5(d) OUTPUT OF AMPLIFIER 22

FIG. 6(a) OUTPUT 20

FIG. 6(b) OUTPUT 21

FIG. 6(c) OUTPUT OF AMPLIFIER 23

FIG. 6(d) OUTPUT OF AMPLIFIER 22

OPTICAL RECORDING MEDIUM AND REPRODUCING APPARATUS

This is a continuation application of Ser. No. 772,473 filed Sept. 4, 1985, now abandoned.

BACKGROUND OF THE INVENTION

1. Field of the Invention

This invention relates to an optical recording medium capable of optically recording and reproducing information thereon and to a reproducing apparatus. Description of the Prior Art Optical disks have heretofore been put into practical use as large capacity recording media.

The optical disks are generally divided into two types, i.e., the type which reproduces recorded information from a variation in the reflectance of a recording track and the type which reproduces recorded information from the rotation of the plane of polarization of a light beam incident on a recording track.

In the optical disk which utilizes a variation in reflectance, a physical pit corresponding to the recorded information is formed on the recording track or the crystalline structure is changed, and reproduction of the recorded signal is effected from a variation in the intensity of reflected light resulting from the presence of the pit or the difference in crystalline structure.

On the other hand, in the magnetooptic disk which utilizes the rotation of the plane of polarization of light, the direction of vertical magnetization of a recording track is varied in conformity with recorded information, and the rotation of the plane of polarization of the reflected light from the disk corresponding to the direction of vertical magnetization by the Kerr effect or the rotation of the plane of polarization of the light transmitted through the disk corresponding to the direction of vertical magnetization by the Faraday effect is detected, whereby signal reproduction is accomplished.

However, in such optical disks according to the prior art, if the spot diameter of a light beam used for signal reproduction is determined, the pitch of tracks cannot be made less than a predetermined value due to the tolerance limit of the crosstalk between adjacent tracks in the disk. Therefore, the recording density determined by the pitch of tracks cannot be exceeded, and this has led to a limited recording capacity.

Among the disks which utilize the rotation of the plane of polarization of light, there is one in which, as disclosed in U.S. Pat. No. 4,467,383, there are provided recording tracks whose direction of vertical magnetization is varied in conformity with recorded information and tracks for tracking arranged alternately with the recording tracks for the tracking of the disk. The surface of these tracks for tracking is flush with the surface of the recording tracks and is treated so that it has a predetermined reflectance different from that of the surface of the recording tracks.

Now, in the disk described in the aforementioned U.S. Pat. No. 4,467,383, the formation of the tracks for tracking is executed by applying a light beam or the like of high output to an amorphous layer provided on the disk (a layer which rotates the plane of polarization of reflected or transmitted light relative to the plane of polarization of linearly polarized incident light by the direction of vertical magnetization) to thereby shift the amorphous state to a crystalline state. The formation of the tracks for tracking requires a highly accurate apparatus and much time and is costly for mass production.

SUMMARY OF THE INVENTION

It is an object of the present invention to provide an optical recording medium which has a recording capacity twice as great as that of the conventional optical recording medium without changing the beam spot diameter of a reproducing apparatus and the track pitch of a disk and which is easy to mass-produce and inexpensive, and a method of manufacturing the same.

To achieve the above object, according to the manufacturing method of the present invention, tracks or pits pre-constructed of convex portions and concave portions are formed on a magnetooptic disk by injection molding, whereafter magnetooptic signals are recorded.

It is another object of the present invention to provide an apparatus which is capable of reproducing information recorded on the magnetooptic signal track and the light intensity signal track of an optical recording medium having a magnetooptic signal track and a light intensity signal track, by a simple optical system and circuit construction through the same optical system.

To achieve the above object, the present invention is constructed so as to apply a linearly polarized light spot to an optical recording medium, divide the reflected light from the optical recording medium into two light components having different planes of polarization, reproduce a magnetooptic signal recorded on the optical recording medium from the difference in intensity between the divided two light components, and reproduce a light intensity signal recorded on the optical recording medium on the basis of at least one of the divided two light components.

BRIEF DESCRIPTION OF THE DRAWINGS

FIGS. 12(a) to 12(d) show the signal wave forms when signals are reproduced from the optical recording medium of FIG. 11 by the reproducing apparatus of FIG. 3.

FIGS. 14(a) to 14(c) show the signal wave forms when signals are reproduced from the optical recording medium of FIG. 11 by the reproducing apparatus of FIG. 13.

DESCRIPTION OF THE PREFERRED EMBODIMENTS

Figure 1:
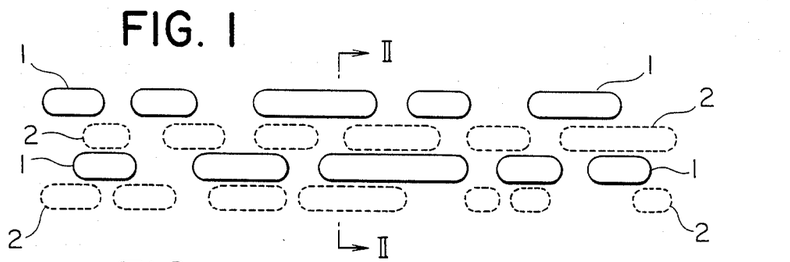
FIG. 1 shows an embodiment of the structure of the optical recording medium of the present invention.

Referring to FIG. 1, light intensity signals 1 comprised of pits indicated by solid lines and magnetooptic signals 2 comprised of pits indicated by broken lines are recorded with an alternate track arrangement on spiral or concentric circular tracks.

Figure 2:
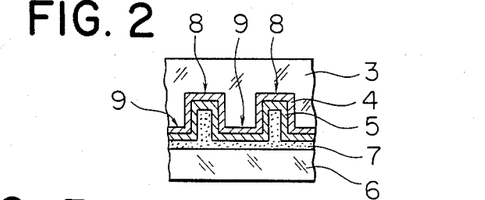
FIG. 2 is a cross-sectional view taken along line II—II of FIG. 1.

Referring now to FIG. 2, reference numeral 3 designates a transparent substrate having a tracking guide groove formed on one surface of a transparent plastic disk by a conventional method such as injection molding, and reference numeral 4 denotes a vertical magnetized layer formed on that surface of the transparent substrate 3 on which the guide groove is formed, by a conventional method such as sputtering. The vertical magnetized layer is comprised of an amorphous magnetic film such as GdTbFe. Reference numeral 5 designates a protective layer further formed on the vertical magnetized layer 4 by a conventional method such as sputtering. For example, $SiO_2$, AlN or the like is used for this protective layer 5. Reference numeral 6 denotes a disk-like substrate of high rigidity formed of glass, plastic, aluminum or the like and made integral with the protective layer 5 by an adhesive agent 7. Thus, a disk-like optical recording medium is constructed.

In such structure of the optical recording medium shown in FIG. 2, the convex portions 8 of the vertical magnetized layer 4 which faces the transparent substrate 3 side form light intensity signal tracks for recording the light intensity signals 1 shown in FIG. 1, and the concave portions 9 of the vertical magnetized layer 4 form magnetooptic signal tracks for recording the magnetooptic signals 2 shown in FIG. 1. The track pitch of the convex portions 8 and concave portions 9 forming the light intensity signal tracks and magnetooptic signal tracks, respectively, i.e., the track pitch between the tracks of the same signal, is set to a value which has taken into consideration the amount of crosstalk between adjacent tracks which is acceptable for recording and reproduction and as a result, the spacing between the light intensity signal track and the magnetooptic signal track comprising the spacing between the convex portion 8 and the concave, portion 9 is ½ of the value of the aforementioned track pitch determined by the crosstalk.

The method of recording signals on the magnetooptic signal tracks and the light intensity signal tracks is known and is carried out in the following manner.

First, recording of magnetooptic signals is accomplished by applying a magnetic field to the recording medium from outside, applying a light beam in this state to thereby heat a part of the magnetooptic signal track to the curie temperature or higher, and reversing the direction of magnetization of the vertical magnetized layer 4. Also, the content once recorded by the reversal of the direction of magnetization can be erased and re-written and accordingly, the the magnetooptic signal track in the recording medium of the present invention has a memorizing function as a read-write memory (hereinafter referred to as RWM) capable of writing in and reading out.

On the other hand, recording of light intensity signals is accomplished by applying to the light intensity signal track a light beam of higher output than the output of the light beam applied during the recording of magnetooptic signals, and phase-shifting the vertical magnetized layer which is in an amorphous state into a crystalline state to thereby vary the reflectance This recording by the phase shift into the crystalline state has the function as a ROM for fixedly recording information because the amorphous state cannot be restored if once changed into the crystalline state.

Figures 3, 4:
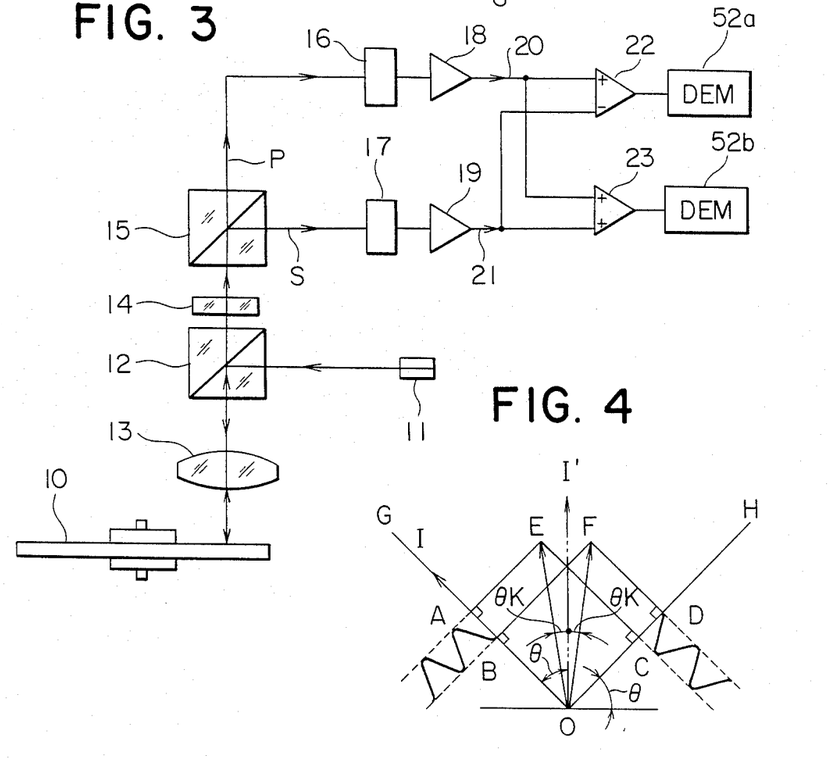
FIG. 3 is a schematic diagram showing an embodiment of the reproducing apparatus used with the optical recording medium of the present invention.
FIG. 4 is a vector diagram showing light detected in the apparatus of FIG. 3.

In FIG. 3, the optical recording medium 10 of the present invention shown in FIGS. 1 and 2 is rotatively driven by a driving device, not shown. A part of the linearly polarized output from a laser light source 11 using a semiconductor laser is caused to be transmitted to the optical recording medium 10 by a beam splitter 12 and the remainder of said linearly polarized output is reflected by the beam splitter 12, and this reflected light is stopped down up to the limit of diffraction of light by an objective lens 13, whereafter it is applied as a beam spot to the optical recording medium 10.

Figure 8:
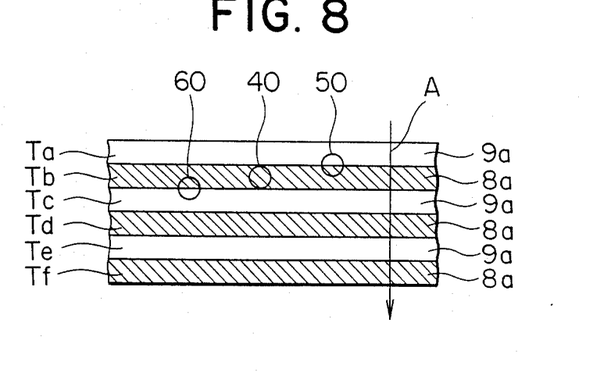
FIG. 8 shows the state of tracking control light beam spots in the apparatus of FIG. 7.

When a beam spot is applied to the convex portions 8 of FIG. 8 forming the light intensity signal tracks in the optical recording medium 10, there is obtained reflected light having an intensity corresponding to the reflectance because the reflectance differs depending on the amorphous state corresponding to the recorded information formed on the light intensity signal tracks and the crystalline state. This reflected light includes the crosstalk component from the concave portions 9 forming the opposite magnetooptic signal tracks, namely, a reflected component whose plane of polarization has been rotated in conformity with the direction of vertical magnetization by the Kerr effect.

On the other hand, the reflected light provided when a beam spot is applied to the concave portions 9 of FIG. 2 forming the magnetooptic signal tracks in the optical recording medium 10 becomes reflected light whose plane of polarization has been rotated in the range of ±0k in conformity with the direction of vertical magnetization by the Kerr effect, and also includes the crosstalk component from the opposite light intensity signal tracks, i.e., the intensity fluctuation of the reflected light.

Such reflected light from the optical recording medium 10 is transmitted through the beam splitter 12 and enters a half-wavelength plate 14 (hereinafter referred to as the λ/2 plate 14, where λ is the wavelength of the light output of the laser light source 11). The λ/2 plate 14 is an optical element having the function of rotating the plane of polarization of light, and the light from the λ/2 plate through a polarizing beam splitter 15 is divided so that the averages of the quantities of light to photoelectric conversion elements 16 and 17 are substantially equal to each other. The polarizing beam splitter 15 is an optical element having the function of totally reflecting the S-polarized incident light and totally transmitting the P-polarized incident light therethrough, or in other words, an optical element for converting the rotational displacement of the plane of polarization of the incident light relative to a reference plane into a light intensity.

The light beams divided by the polarizing beam splitter 15 are converted into currents corresponding to the light intensities by the photoelectric conversion elements 16 and 17, and are converted into voltage signals by buffer amplifiers 18 and 19. The output 20 of the buffer amplifier 18 is a P-polarized output which is applied to the positive input terminal of a differential amplifier 22 and one positive input terminal of an addition amplifier 23, while the output 21 of the buffer amplifier 19 is an S-polarized output which is applied to the negative input terminal of the differential amplifier 22 and the other positive input terminal of the addition amplifier 23. The output of the differential amplifier 22 is input to a demodulator 52a and the output of the addition amplifier 23 is input to a demodulator 52b.

The light-dividing function conforming to the plane of polarization of the reflected light beam by the λ/2 plate 14 and the polarizing beam splitter 15 in the reproducing optical system will now be described in detail. First, as regards the light which has entered a disk as a linearly polarized light, the plane of polarization of the reflected light is varied in the range of ±θk by the Kerr effect in conformity with the direction of vertical magnetization (upward direction or downward direction) in the disk.

That is, if, in the vector diagram of FIG. 4, the plane of polarization of the linearly polarize light entering the optical recording medium is OI and the plane of polarization of the reflected light from the medium 10 through the λ/2 plate 14 when the medium 10 is a mere reflecting plate is OI', the plane of polarization of the reflected light from the medium 10 through the λ/2 plate 14 rotates in the range of ±θk in conformity with the direction of magnetization as indicated by vectors OE and OF. The reflected light beam whose plane of polarization thus varies in the range of ±θk enters the λ/2 plate. The plane of polarization of the reflected light passed through the λ/2 plate 14 is adjusted by the λ/2 plate so that <IOI', that is, θ is 45°, and the reflected light is divided by the polarizing beam splitter 15 so that the average quantities of light to the photoelectric conversion elements 16 and 17 are equal to each other. At this time, light varying between OC and OD which are projections on the axis OH of the vectors OE and OF in FIG. 4 is applied to the photoelectric conversion element 16, and light varying between OA and OB which are projections on the axis OG of the vectors OE and OF is applied to the photoelectric conversion element 17.

The operation of the reproducing circuit shown in FIG. 3 will now be described by reference to FIGS. 5(a) to 5(d) and 6(a) to 6(d) which show signal wave forms.

FIGS. 5(a) to 5(d) show the wave forms of reproduction signals when a light beam spot is tracing the light intensity signal tracks (the convex portions 8 of FIG. 2) in the optical recording medium of the present invention, and FIGS. 6(a) to 6(d) show the wave forms of reproduction signals when a light beam spot is tracing the magnetooptic signal tracks (the concave portions 9 of FIG. 2). In FIGS. 5(a) to 5(d) and 6(a) to 6(d), in order to distinguish between the main reproduction signal component and the crosstalk signal component, the signal frequency of the magnetooptic signal is made higher than the signal frequency of the light intensity signal.

Figure 5A:
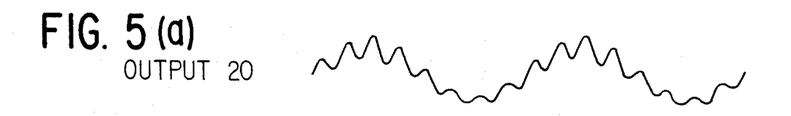
FIGS. 5(a) to 5(d) show the signal wave forms at various locations in the reproducing apparatus of FIG. 3 which are obtained when a light intensity signal track is traced.
Figure 5B:
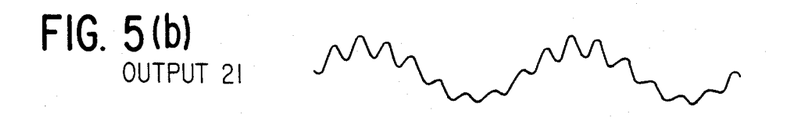

First, when the light beam spot is tracing the light intensity signal tracks in the magnetooptic recording medium 10, light intensity signals according to the amorphous state an the crystalline state on the light intensity signal tracks are obtained as main signals on the photoelectric conversion elements 16 and 17 of the reproducing circuit shown in FIG. 3, and further, the crosstalk components by the opposite magnetooptic signal tracks are included in the main signals and are converted into voltage signals by the buffer amplifiers 18 and 19 and thus, output signal wave forms shown in FIGS. 5(a) and 5(b) are obtained. That is, the buffer amplifier outputs of FIGS. 5(a) and 5(b) are signal wave forms in which magnetooptic signals providing crosstalk components of high frequency are superposed on light intensity signals providing main signals of low frequency.

Figures 5C, 5D:
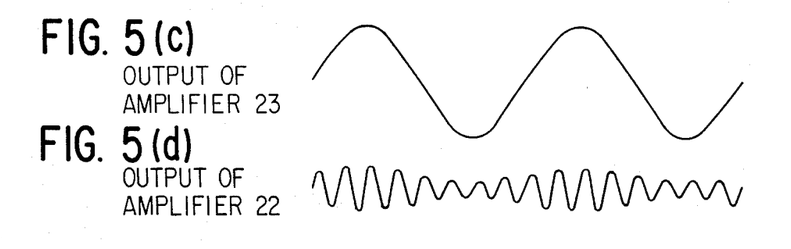

The buffer amplifier outputs 20 and 21 of the magnetooptic signals depending on the rotation of the plane of polarization which provide the crosstalk components are inverted to each other in direction of amplitude and therefore, the crosstalk components by the magnetooptic signals are negated in the addition amplifier 23, and only the addition output of the light intensity signals is reproduced as shown in FIG. 5(c).

On the other hand, in the differential amplifier 22, the light intensity signals are offset and the addition output of the crosstalk components is obtained as shown in FIG. 5(d), and this signal is the reproduction signal from the magnetooptic signal tracks positioned on the opposite sides of the light intensity signal track and is not used as a reproduction signal because both magnetooptic signals are mixed with each other When the light beam spot is tracing the magnetooptic signal tracks (the concave portions of FIG. 2) in the optical recording medium 10 of the present invention, a magnetooptic signal obtained by converting the rotation of the plane of polarization by the Kerr effect in the magnetooptic signal tracks into an intensity of light and crosstalk components obtained from the opposite light intensity signal tracks are included in the outputs of the photoelectric conversion elements 16 and 17 of the reproducing circuit shown in FIG. 3. The outputs of the elements 16 and 17 are converted into voltage signals by the buffer amplifiers 18 and 19 and assume the output signal wave forms shown in FIGS. 6(a) and 6(b). Accordingly, the crosstalk components of low frequency from the light intensity signal tracks are included in the wave forms of the output signals of the buffer amplifiers 18 and 19 shown in FIGS. 6(a) and 6(b).

Figure 6A:
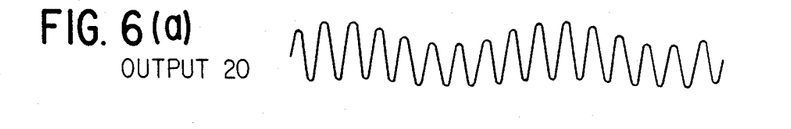
FIGS. 6(a) to 6(d) show the signal wave forms at various locations in the reproducing apparatus of FIG. 3 which are obtained when a magnetooptic signal track is traced.
Figure 6B:
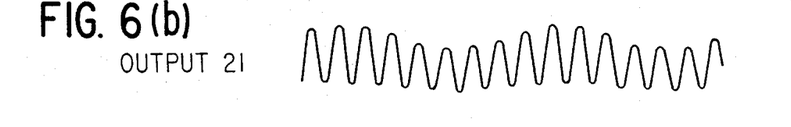
Figure 6C:
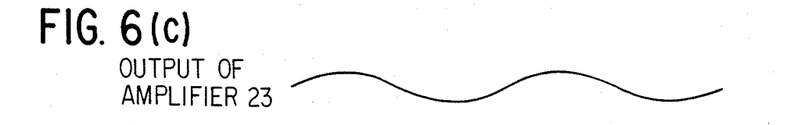
Figure 6D:
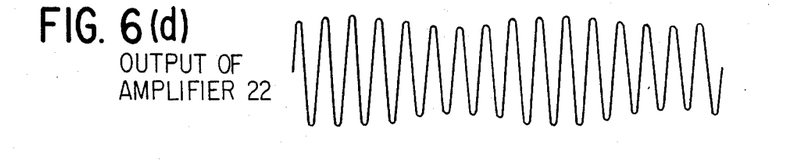

The outputs of the buffer amplifiers 18 and 19 are applied to the differential amplifier 22 and the addition amplifier 23 and, in the differential amplifier 22, the crosstalk component by the light intensity signal track is negated and only the magnetooptic signal component is added and reproduced as shown in FIG. 6(d). The magnetooptic signal put out from the differential amplifier 22 is very slightly AM-modulated by the same phase component, but this offers no hindrance in detecting and determining the presence and length of a magnetic pit. On the other hand, in the addition amplifier 23, the magnetooptic signal is negated and the light intensity signal providing the crosstalk component shown in FIG. 6(c) is reproduced, and this reproduction signal is from the light intensity signal tracks on the opposite sides of the reproduced magnetooptic signal track and moreover has the signals of the opposite tracks mixed therewith and therefore, it is not used as a reproduction signal.

When the light beam spot is thus tracing the light intensity signal tracks in the magnetooptic medium, the light intensity signal can be reproduced while being separated from the crosstalk components from the opposite magnetooptic signal tracks and, on the other hand, when the light beam spot is tracing the magnetooptic signal tracks, the magnetooptic signal can be reproduced while being separated from the crosstalk components from the opposite light intensity signal tracks. Also, in FIGS. 5(a) to 5(d) and 6(a) to 6(d), the magnetooptic signal is shown as a signal of higher frequency than the light intensity signal, but as is apparent from the foregoing description, unnecessary signals are offset and therefore, there is no limitation in the frequency bands of the two signals. Further, in the medium structure of FIG. 2, the convex portions 8 of the vertical magnetized layer 4 are allotted as the light intensity signal tracks and the concave portions 9 are allotted as the magnetooptic signal tracks, but alternatively, use may be made of the converse track allotment.

Furthermore, the phase transition of the vertical magnetized layer between the amorphous state and the crystalline state is utilized as the method of recording light intensity signals on the optical recording magnetic medium, whereas this is not restrictive, but any suitable method in which the reflectance changes in conformity with the signal state can be adopted and for example, a light beam spot of great output may be applied to physically deform the optical recording medium, for example, form a hole therein, thereby changing the reflectance, i.e., the quantity of reflected light, and obtaining a light intensity signal.

Figure 7:
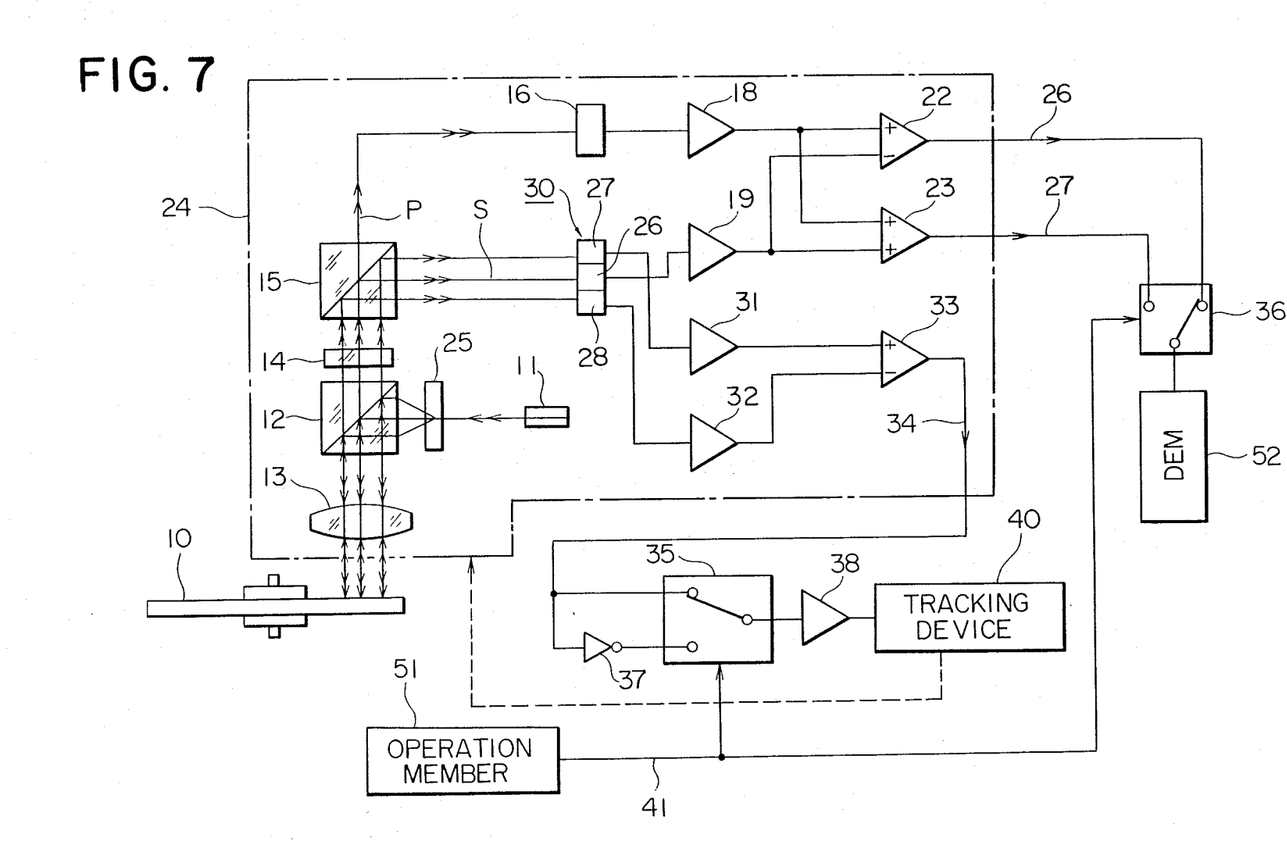
FIG. 7 is a schematic diagram showing a reproducing apparatus provided with the track change-over function for obtaining tracking control and reproduction signals.

FIG. 7 shows a more specific embodiment of the reproducing circuit used in the optical recording medium of the present invention, and is a block diagram embodying the tracking control including the change-over of the light intensity signal tracks and magnetooptic signal tracks of the optical recording medium and the change-over of the then reproduction signal.

In FIG. 7, an optical system block 24 basically includes the optical system and the reproducing circuit shown in FIG. 3. The optical system comprises a laser light source 11, a beam splitter 12, an objective lens 13, a λ/2 plate 14, a polarizing beam splitter 15 and a grating (diffraction grating) 25. The functions of the grating 25 and a three-division photoelectric detector 30 will be made clear in the ensuing description of the operation.

A photoelectric conversion element 26 in the three-division photoelectric detector 30 corresponds to the photoelectric conversion element 17 in the reproducing circuit of FIG. 3. The converted current is converted into a voltage signal by the buffer amplifier 19, magnetooptic signals are reproduced from the outputs of the buffer amplifiers 18 and 19 by the differential amplifier 22, and a light intensity signal 27 is reproduced by the addition amplifier 23.

Buffer amplifiers 31 and 32 convert the photoelectrically converted currents obtained from photoelectric conversion elements 27 and 28 in the three-division photoelectric detector 30 into voltage signals, and apply the same signals to a differential amplifier 33 to thereby create a tracking control signal 34. The tracking control signal 34 from the differential amplifier 33 and a tracking control signal inverted by an inverter 37 are input to a switch 35, and the magnetooptic signal 26 from the differential amplifier 22 and the light intensity signal 27 from the addition amplifier 23 are applied to a switch 36. Each of the switches 35 and 36 changes over its switch contacts by the track change-over signal 41 of the light intensity signal tracks and the magnetooptic signal tracks, and the switches 35 and 36 are changed over in operative association with each other. The track change-over signal 41 is produced in response to the operation of an operation member 51. The change-over output of the switch 35 is applied to a servo-amplifier 38, and a driving signal is imparted to a tracking device 40 for moving the light beam spot applied to the optical recording medium 10 in the tracking direction in response to the tracking control signal put out from the switch 35, thus driving the optical system block 24 so as to ensure the light beam spot to be positioned at the center of the intended track. A demodulator 52 demodulates the light intensity signal 27 or the magnetooptic signal 26 passed through the switch 36.

The tracking control and signal change-over in the embodiment of FIG. 7 will now be described.

FIG. 8 is an illustration of tracks on the optical recording medium for explaining the known tracking control system, and shows, in succession from the light beam application side, tracks Ta, Tb, Tc, Td, Te and Tf disposed in the form of concentric circles or spirals.

Light intensity signal tracks 8a providing convex portions are indicated by hatching, and magnetooptic signal tracks 9a providing concave portions are formed between the hatching portions.

Figure 9:
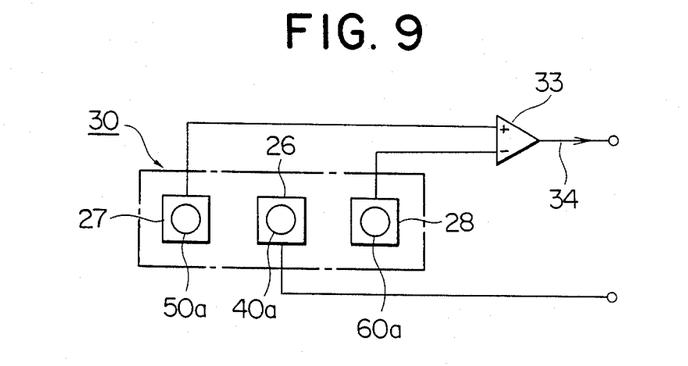
FIG. 9 shows an example of the detecting portion for obtaining a tracking control signal from the light beam spots of FIG. 8.

For such a track arrangement, with a two-beam method, three light beam spots 40, 50 and 60 are applied onto the tracks, and the formation of these three beam spots 40, 50 and 60 is usually accomplished by obtaining three light beam spots of O-order light and ±1st-order light from a single light beam by the use of a grating. Of these three beam spots, the beam spot 40 is a light beam spot for reproduction signal, and the O-order light obtained from the diffraction grating is used as this beam spot. The beam spots 50 and 60 are light beam spots for tracking control, and the ±1st-order light and the −1st-order light obtained from the diffraction grating are used as these beam spots, respectively FIG. 9 illustrates the construction of a detector for obtaining a tracking control signal. The detector has three photoelectric conversion elements 26, 27 and 28 which together constitute the three-division photoelectric detector 30, and a differential amplifier 33 for obtaining a tracking control signal 34, and it is included in the reproducing circuit of this circuitry (but buffer amplifiers 31 and 32 are omitted) The reflected light beam spots 40a, 50a and 60a of the beam spots 40, 50 and 60 shown in FIG. 8 are imaged on the photoelectric conversion elements 26, 28 and 27, respectively, of the three-division photoelectric detector 30, and are converted into electrical signals thereby.

Figure 10:
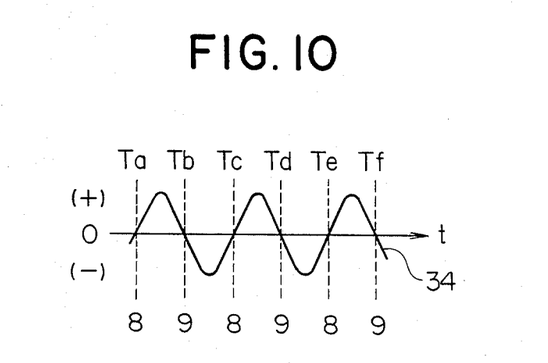
FIG. 10 shows the wave form of the tracking control signal obtained when the light beam spots are moved in the direction of arrow A in FIG. 8.

The quantities of the reflected light beam spots 40a, 50a and 60a on the three-division photoelectric detector 30 of FIG. 9 vary under the influence of the diffraction by the tracking guide groove, and a signal obtained from the outputs of the photoelectric conversion elements 27 and 28 and the differential amplifier 33 provides the tracking control signal 34 shown in FIG. 10. The tracking control signal 34 of FIG. 10 has a signal wave form which assumes a zero voltage at the central position of each track Ta, Tb, . . . , Tf when the beam spot 40 is moved in the direction of arrow A in FIG. 8 and which has polarity that becomes positive when the spot 40 is moved from the center of the convex portion 8 to the center of the concave portion 9 and becomes negative when the spot 40 is moved from the center of the concave portion 9 to the center of the convex portion 8. Accordingly, in a state wherein the light beam spot 40 for reproduction signal is traced at the center of the light intensity signal track (convex portion 8) as shown in FIG. 8, the tracking control signal put out from the differential amplifier 33 becomes zero. That is, when the light beam spots 50 and 60 for tracking control overlie the edges of the tracking guide groove equally as shown in FIG. 8, the quantities of reflected light of the light beam spots 50 and 60 are equal and as a result, the output of the differential amplifier 33 becomes zero. Likewise, the tracking control signal 34 becomes zero also when the light beam spot 40 for reproduction signal is traced at the center of the magnetooptic signal track (concave portion 9).

Thus, in the above-described system, as shown in FIG. 10, a tracking control signal 34 inverted in polarity is obtained when the spot 40 is moved from the track 8a to the track 9a and when the spot is moved from the track 9a to the track 8a, and this tracking control signal 34 is utilized to constitute a servo-control system comprising a servo-amplifier 38 and a tracking device 40 shown in FIG. 7. This servo-control system constitutes a negative feedback loop for controlling the optical system block 24 while always referring to the tracking control signal 34 in order to keep the object to be controlled in a predetermined state, that is, in the embodiment of FIG. 7, to keep the position of the light beam spot at the center of the track. However, as shown in FIG. 10, on the light intensity signal track and the magnetooptic signal track, the polarity of the tracking detection signal 34 is inverted and therefore, in the embodiment of FIG. 7, the tracking control signal 34 is inverted by the inverter 37 and the tracking control signal 34 and the inverted tracking control signal are changed over by the switch 35 so that a negative feedback loop can always be constructed even if the polarity of the tracking control signal 34 is inverted by the change-over of the track. Also, the switch 36 which selects one of the magnetooptic signal 26 and the light intensity signal 27 is changed over in response to the switch 35 and therefore, there can be obtained reproduction signals corresponding to the respective tracks.

Figure 11:
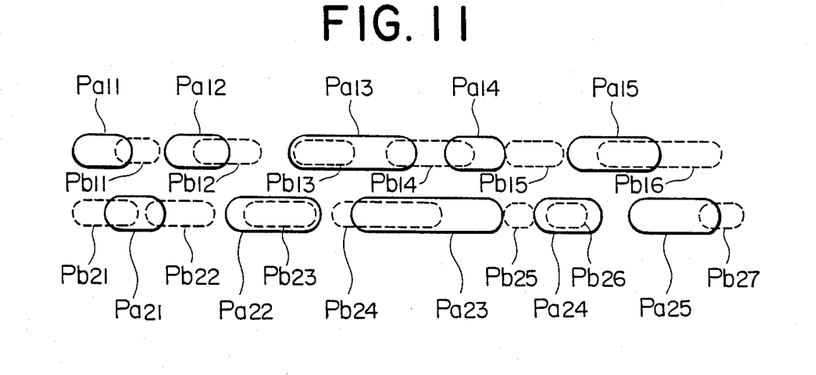
FIG. 11 shows another embodiment of the structure of the optical recording medium of the present invention.

FIG. 11 is an enlarged partial plan view of an optical recording medium (disk) on which magnetooptic signals and light intensity signals are overlappingly recorded on the same spiral or concentric circular tracks.

In FIG. 11, the pit row indicated by solid lines represents a concavo-convex bit row injection-molded by light intensity signals and the pit row indicated by dotted lines represents the magnetic pits by vertical magnetic recording. These magnetic pits are formed by inverting the direction of magnetization of the vertical magnetized layer pre-magnetized in a predetermined direction.

In FIG. 11, $Pa_{11}$–$Pa_{15}$ and $Pb_{11}$–$Pb_{16}$ respectively designate a pit row and a magnetic pit row comprising the concave portions and convex portions of a first track. $Pa_{21}$–$Pa_{25}$ and $Pa_{21}$–$Pa_{27}$ respectively designate a pit row and a magnetic pit row comprising the concave portions and convex portions of a second track.

The structure of the cross-section of this optical recording medium, like that shown in FIG. 2, is comprised of a transparent substrate, a vertical magnetized layer, an adhesive agent and a substrate. The level difference between the concave portion and the convex portion which form a light intensity signal is a value obtained by dividing $\frac{1}{4}$ of the wavelength $\lambda$ of the laser light by the refractive index of the transparent substrate. By the setting of this level difference, the quantity of reflected light from the medium 10 is varied when the beam spot lies on the convex portion and when the beam spot lies on the concave portion.

Figure 12A:
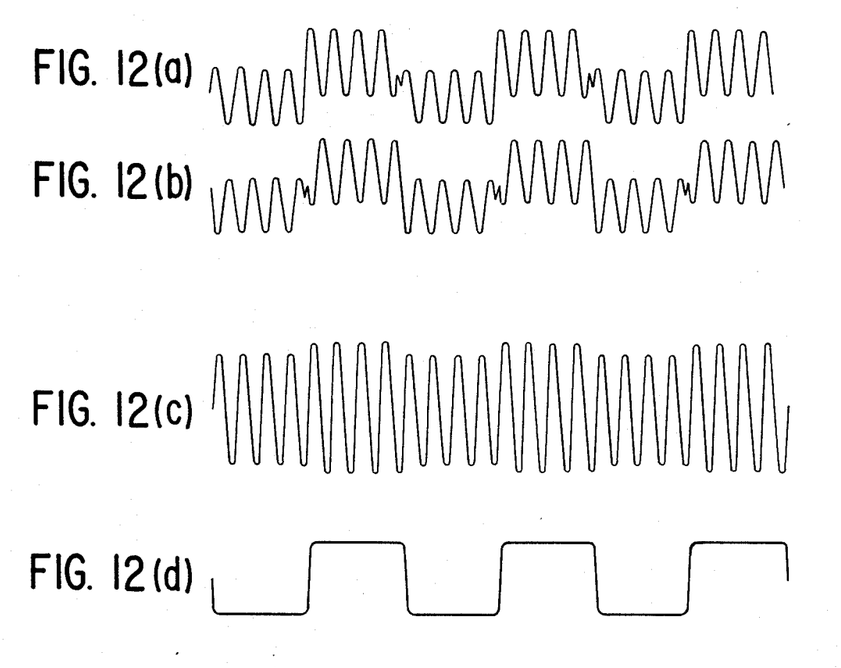

When a signal has been reproduced from the optical recording medium of FIG. 11 by the reproducing apparatus shown in FIG. 3, the magnetooptic signal by the magnetic pit and the light intensity signal indicative of the variation in the quantity of reflected light by the concavo-convex pit are contained in the elements 16 and 17, respectively, and these signals are converted into voltage signals by the buffer amplifiers 18 and 19, respectively, and assume the output signal wave forms shown in FIGS. 12(a) and 12(b). FIGS. 12(a) to 12(d) show a case where the magnetooptic signal is a signal of higher frequency than the light intensity signal. In the differential amplifier 22, the two input signals which are light intensity signals are negated because they are of the same phase, and only the magnetooptic signal is put out as shown in FIG. 12(c).

On the other hand, in the addition amplifier 23, the two input signals which are magnetooptic signals are negated because they are opposite in phase, and only the component of the same phase, i.e., the light intensity signal, is put out as shown in FIG. 12(d).

Figure 13:
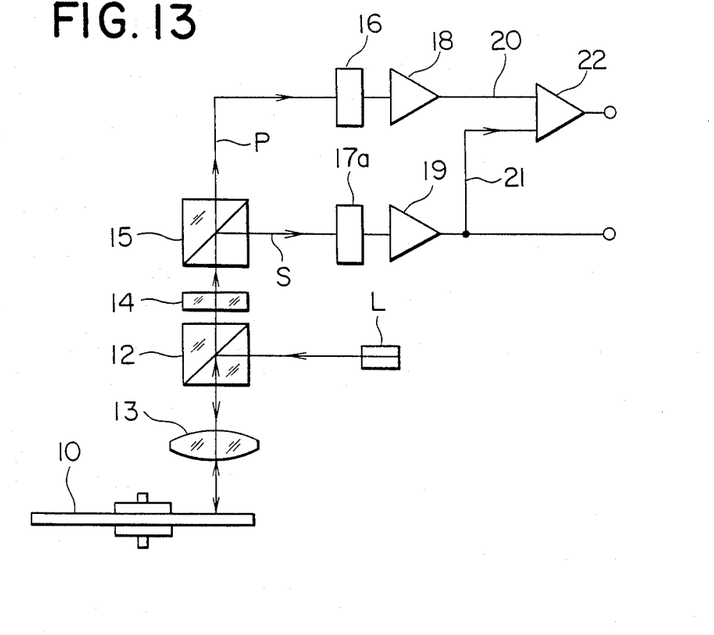
FIG. 13 is a schematic diagram showing another embodiment of the reproducing apparatus for the optical recording medium of FIG. 11.

In FIG. 13, the set angle of the $\lambda/2$ plate 14 differs from that in FIG. 7 and $\theta$ is not 45°, and the light is not divided so that the quantities of light to photoelectric conversion elements 16 and 17a are equal. That is, as shown in the vector diagram of FIG. 15, the set angle $\theta$ of the $\lambda/2$ plate 14 is set so that for example, $\theta = 10°$. Also, an avalanche photodiode (hereinafter referred to as APD) is used as the photoelectric conversion element 17a. Unlike FIG. 3, the addition amplifier 23 is not provided.

Figure 15:
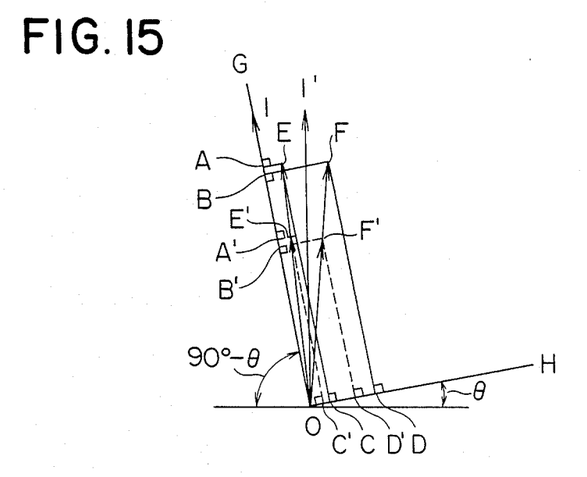
FIG. 15 is a vector diagram showing light detected in the reproducing apparatus of FIG. 13.

The behavior of the reflected light beam from the disk 10 in the reproducing optical system shown in FIG. 13 is similar to that in the optical system of the previous embodiment shown in FIG. 3. That is, when the quantity of reflected light is great, light varying between OC and OD, which are the projections on the axis OH of vectors OE and OF in FIG. 15, is applied to the APD 17a, and light varying between OA and OB, which are the projections on the axis OG of vectors OE and OF, is applied on the photoelectric conversion element 16. Also, when the quantity of reflected light is small, light varying between OC' and OD', which are the projections on the axis OH of vectors OE' and OF' in FIG. 15, is applied to the APD 17a, and light varying between OA' and OB' which are the projections on the axis OG of vectors OE' and OF', is applied onto the photoelectric conversion element 16. Here, $\angle IOE = \angle IOF = \theta k$.

In the embodiment of FIG. 13, unlike the embodiment of FIG. 3, the average quantities of light on the APD 17a and the photoelectric conversion element 16 do not become equal to each other. Therefore, even if said quantities of light are current-voltage-converted by the buffer amplifiers 18 and 19 and the differential therebetween is taken in the differential amplifier 22, the magnitudes of noise components of the same phase proportional to the average quantities of light do not become equal to each other at two inputs and noise is not suppressed. Therefore a magnetooptic signal of good quality is not reproduced and thus, in the present embodiment, to provide the noise suppressing effect, the signal indicative of the smaller average quantity of light is amplified by the use of the APD 17a. To provide the noise suppressing effect, the design may be such that the average photocurrents put out from the two photoelectric conversion elements 16 and 17a are equal to each other and therefore, if $\theta$ in FIG. 15 is used, the multiplication rate m of the APD may be as follows:

Since the average quantity of light on the APD 17a side is $A^2\sin^2\theta$ and the average quantity of light on the photoelectric conversion element 16 side is $A^2\cos^2\theta$, $$m = \frac{A^2 \cdot \cos^2\theta}{A^2 \cdot \sin^2\theta} = \frac{1}{\tan^2\theta}.$$

If $\theta$ is chosen, for example, to $\theta = 10°$, $$m = 1/\tan^2 10° \approx 32.2.$$

Figure 14A:
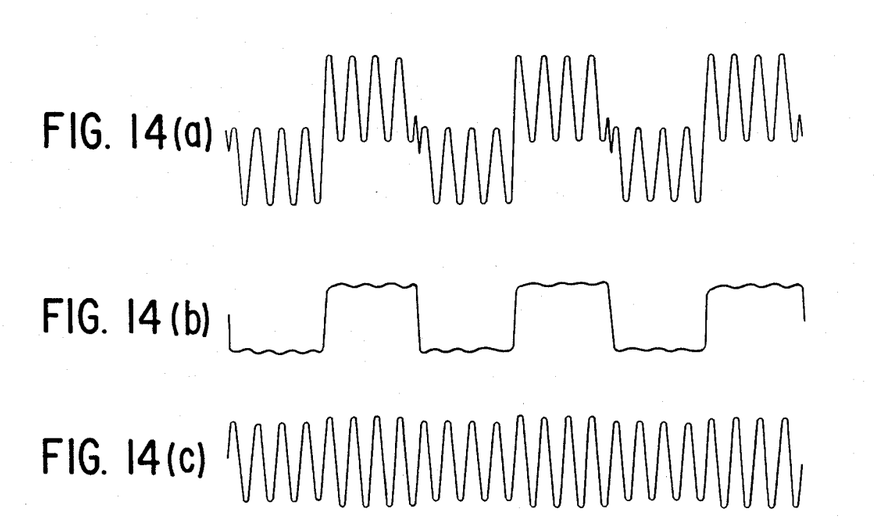

FIGS. 14(a) to 14(c) show the signal wave forms at various locations in the reproducing circuit when the multiplication rate m of the APD 17a is so set. FIG. 14(a) shows the wave form of the output signal of the buffer amplifier 18 and FIG. 14(b) shows the wave form of the output signal of the buffer amplifier 19. In the differential amplifier, the light intensity signals which are components of the same phase are also negated because the multiplication rate m of the APD 17a is so set that the magnitudes of noise components of the same phase are equal to each other, and a signal is put out as shown in FIG. 14(c). The output of the buffer amplifier 19 shown in FIG. 14(b) may be used as the light intensity signal.

Unlike the embodiment shown in FIG. 3, in the embodiment shown in FIG. 13, the addition amplifier 23 is not provided. This is because the division ratio of the quantity of light by the $\lambda/2$ plate 14 is not equal and therefore the component by the magnetooptic signal is actually included in the signal shown in FIG. 14(b) but the signal by the magnetooptic effect is generally low in degree of modulation and therefore it is possible to neglect such signal relative to a light intensity signal which permits a great degree of modulation to be secured and which enables signal reproduction of good quality. Therefore, as compared with the embodiment of FIG. 3, the embodiment of FIG. 13 has an advantage that the addition amplifier 23 can be omitted.

As described above, the embodiment shown in FIG. 13 is more suitable when the degree of modulation of the magnetooptic signal component is low, that is, the Kerr rotation angle $\theta k$ of the magnetooptic reproduction signal is small, than the embodiment shown in FIG. 3. Also, in actual use, if the differential amplifier used is ideal and the common mode rejection ratio is infinite, noise components of the same phase or signal components of the same phase balanced in magnitude can be completely rejected, but in the actual differential amplifier, the common mode rejection ratio is not infinite and in this case, the proportion of the components of the same phase in the reproduction signal on the APD 17a side becomes smaller when $\theta$ is less than 45° as shown in FIG. 15 and the divided quantity of light on the APD 17a side is made small than when $\theta = 45°$ as shown in FIG. 4 and the divided quantities of light are equal to each other, and this is advantageous to the rejection of the components of the same phase by differential amplification.

Figure 16:
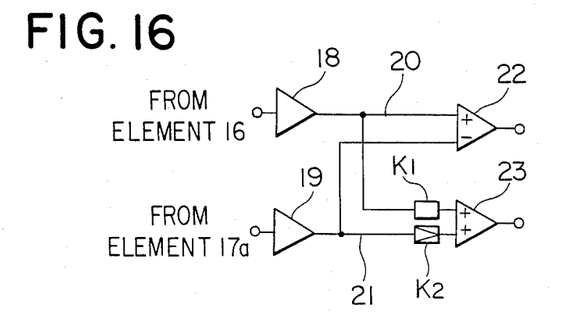
FIG. 16 shows another embodiment of the reproducing apparatus of the present invention.

Of course, where the degree of modulation of the magnetooptic signal becomes high and not negligible to the light intensity signal, an addition amplifier may be provided to suppress the magnetooptic signal component relative to the light intensity signal. In this case, as shown in FIG. 16, in addition to the addition amplifier 23, a level adjusting mechanism for equalizing the magnitudes of the magnetooptic signal components at the two inputs of the addition amplifier 23 must be provided. Specifically, such level adjusting mechanism may be an amplifier $K_2$ for the output signal of the amplifier 19 or an attenuator $K_1$ for the output signal of the amplifier 18. In some cases, both of them may be used.

In the embodiment of FIG. 13, APD is used as a photoelectric conversion element having the amplifying function, but alternatively, the photoelectric conversion element may be constructed by the use of an ordinary photoelectric conversion element (for example, a PIN photodiode) and an amplifier. Generally in the latter case, the noise created by the amplifier is greater than the noise created by the APD itself and therefore, when the Kerr rotation angle $\theta k$ of the magnetooptic reproduction signal is small, there is an undesirable possibility that the S/N ratio of the reproduction signal cannot be sufficiently secured. Alternatively, the design may be such that the two divided light beams are photoelectrically converted by APDs. Where the photoelectric conversion is thus effected by two APDs, the two APDs may be installed so that the temperature conditions therefor are the same, whereby a temperature compensating circuit for the APDs can be eliminated. That is, since the temperature conditions for the two APDs are equal, the same variation in amplification rate occurs for temperature and as a result, there is no relative difference between the components of the same phase included in the two input signals at the inputs of the differential amplifier and, even if the temperature conditions for the APDs change, the components of the same phase input to the differential amplifier can be made coincident with each other. Also, in the embodiments of FIGS. 3 and 13, the plane of polarization of the reflected light is rotated by a combination of $\lambda/2$ plate and a polarizing beam splitter to thereby provide two divided optical paths, but the $\lambda/2$ plate can be eliminated by rotating the polarizing beam splitter itself about the optic axis.

Figure 17:
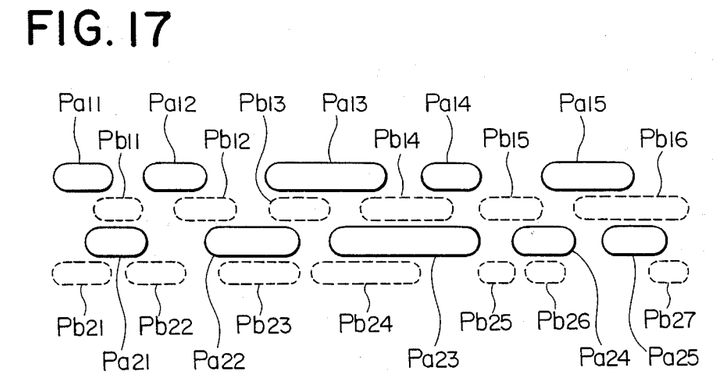
FIG. 17 shows another embodiment of the optical recording medium of the present invention.

FIG. 17 shows another example of the medium usable in the present invention in which the magneto-optic signals by vertical magnetic recording are recorded between the light intensity signal tracks by a concave-convex pit row pre-recorded in the form of spiral or concentric circles.

The above-described embodiments are also applicable to the disk of FIG. 3 having no guide groove. For example, if light intensity signals are first recorded on a disk having no record thereon by mechanical feeding, tracking control can be accomplished by the utilization of the reproduction signal of the light intensity signal track. Of course, the magnetooptic signal track may be used to obtain a tracking detection signal.

Further, the above-described embodiments have been described with a disk-like optical recording medium taken as an example, but the recording medium of the present invention is not restricted to such shape, and the light beam for recording and reproduction and the medium may be moved relative to each other.

Furthermore, the optical recording medium of the present invention is a so-called non-volatile memory in which the track-recorded content of light intensity signals is fixed and therefore can be used as P-ROM, for instance, while on the other hand, the magnetooptic signal track is capable of erasing and re-writing information and therefore this optical recording medium can be used as RWN. Where the optical recording medium of the present invention is used as the external memory device of a computer, for example, by the utilization of such feature, it is possible to accomplish so-called composite recording in which software and OS which do not require rewriting and further, a word processor or the like are recorded on the light intensity signal track while, on the other hand, software such as user program or data which requires rewriting is recorded on the magnetooptic signal track. Of course, the recording capacity of the optical recording medium is increased by a factor of 2 and therefore, even when the recording medium is used as a composite memory of P-ROM and RWM, a sufficient recording capacity can be secured.

What is claimed is:

1. A recording medium comprising disc-shaped substrate having laterally adjacent first and second circumferentially-extending recording tracks thereon, said tracks being at entirely different levels relative to said substrate, said first track having means thereon for significantly modifying only the polarization of polarized light incident thereon in accordance with magnetooptic information recorded on said first track, and said second track having means thereon for significantly modifying only the intensity of light incident thereon in accordance with light intensity information recorded on said second track.

2. A recording medium according to claim 1, wherein said tracks comprise concentric circles.

3. A recording medium according to claim 1, wherein said means on said first track comprises a material that rotates the plane of polarization of linearly polarized light incident thereon, and wherein said means on said second track comprises a material that reflects light incident thereon.

4. A recording medium according to claim 1, wherein each of said first and second tracks has laterally successive portions provided at a pitch P which is at least as great as a predetermined pitch required to prevent substantial cross talk between the successive portions, and wherein adjacent portions of said first and second tracks are provided at one half of said pitch P.

5. A recording medium according to claim 1, wherein said first track has information recorded thereon in the form of regions of differing magnetization and said second track has information recorded thereon in the form of regions of differing reflectance.

6. A recording medium according to claim 5, wherein said regions of differing reflectance comprise crystalline regions distinguishable from adjacent amorphous regions.

7. A recording medium comprising a substrate having laterally adjacent first and second tracks thereon, said first track and said second track being at entirely different levels relative to said substrate, said first track comprising a plurality of laterally successive portions and said second track comprising a plurality of laterally successive portions that alternate with the portions of said first track, said first track being a magnetooptic signal track having information recorded thereon only in the form of regions of differing magnetization, said second track being a light intensity signal track and having information recorded thereon only in the form of regions of differing reflectance.

8. A recording medium in accordance with claim 7, wherein said regions of said second track comprise distinguishable crystalline and amorphous regions.

9. A recording medium in accordance with claim 7, wherein said regions of differing magnetization and said regions of differing reflectance are formed in a layer of material that is common to said first track and said second track.

10. A recording medium comprising a substrate having laterally adjacent first and second tracks thereon that are at entirely different levels relative to said substrate, said first track having means thereon for significantly modifying the polarization of polarized light incident thereon in accordance with magnetooptic information recorded on said first track, said second track having means thereon for modifying the intensity of light incident thereon, without significant modification of polarization, in accordance with light intensity information recorded on said second track.

* * * * *